(12) United States Patent
Zheng et al.

(10) Patent No.: US 10,061,926 B2
(45) Date of Patent: *Aug. 28, 2018

(54) METHOD AND SYSTEM FOR UNLOCKING AND DELETING FILE AND FOLDER

(71) Applicant: BEIJING QIHOO TECHNOLOGY COMPANY LIMITED, Beijing (CN)

(72) Inventors: Wenbin Zheng, Beijing (CN); Yu Wang, Beijing (CN)

(73) Assignee: Beijing Qihoo Technology Company Limited, Beijing (CN)

( * ) Notice: Subject to any disclaimer, the term of this patent is extended or adjusted under 35 U.S.C. 154(b) by 4 days.

This patent is subject to a terminal disclaimer.

(21) Appl. No.: 14/828,217

(22) Filed: Aug. 17, 2015

(65) Prior Publication Data
US 2015/0356298 A1 Dec. 10, 2015

Related U.S. Application Data

(63) Continuation of application No. 14/128,592, filed as application No. PCT/CN2012/077381 on Jun. 21, 2012, now Pat. No. 9,152,792.

(30) Foreign Application Priority Data

Jun. 27, 2011 (CN) .......................... 2011 1 0175389

(51) Int. Cl.
*G06F 11/00* (2006.01)
*G06F 12/14* (2006.01)
(Continued)

(52) U.S. Cl.
CPC ...... *G06F 21/568* (2013.01); *G06F 17/30117* (2013.01); *G06F 21/56* (2013.01)

(58) Field of Classification Search
CPC ... G06F 17/30734; G06F 21/56; G06F 21/568
(Continued)

(56) References Cited

U.S. PATENT DOCUMENTS 5,951,698 A 9/1999 Chen et al.
6,240,530 B1 5/2001 Togawa
(Continued)

FOREIGN PATENT DOCUMENTS

| CN | 101192262 | 6/2008 |
| CN | 101276391 | 10/2008 |
| CN | 101611412 | 12/2009 |

OTHER PUBLICATIONS

Paul J. Leach; The File System of an Integrated Local Network; ACM; Mar. 12-14, 1985; p. 309-324.*
(Continued)

*Primary Examiner* — Monjour Rahim
(74) *Attorney, Agent, or Firm* — Baker & Hostetler LLP

(57) ABSTRACT

A method and system for unlocking and deleting a file or a folder. The method for unlocking the file or the folder comprises: receiving an unlock request of a file or a folder, wherein the unlock request includes an input parameter; verifying whether the input parameter complies with a preset condition; if the input parameter complies with the preset condition, correcting a deformed path format of the file or the folder and/or the special file name of the file or the special folder name of the folder according to a preset rule; determining whether restrictive setting of the corrected file or folder is present; and if yes, cleaning the restrictive setting of the file or the folder. The embodiments of the present invention relieves layer by layer the protections arranged by files infected with a virus by employing a plurality of means such as removing the read-only lock, removing the routine lock, adding the authority and closing the handle, thereby (Continued)

increasing the confrontation capacity of a security software against a malignant program.

16 Claims, 6 Drawing Sheets

(51) Int. Cl.
    *G06F 12/16* (2006.01)
    *G08B 23/00* (2006.01)
    *G06F 21/56* (2013.01)
    *G06F 17/30* (2006.01)

(58) Field of Classification Search
    USPC .......................................................... 726/24
    See application file for complete search history.

(56) References Cited

U.S. PATENT DOCUMENTS

| | | | |
|---|---|---|---|
| 6,842,770 B1* | 1/2005 | Serlet | G06F 17/30067 |
| | | | 707/E17.01 |
| 7,620,887 B1* | 11/2009 | Lubbers | G06F 11/3692 |
| | | | 715/205 |
| 7,739,738 B1 | 6/2010 | Sobel et al. | |
| 8,302,192 B1 | 10/2012 | Cnudde et al. | |
| 2003/0182253 A1* | 9/2003 | Chen | G06F 17/30067 |
| 2004/0111302 A1* | 6/2004 | Falk | G06Q 10/10 |
| | | | 705/4 |
| 2005/0091658 A1* | 4/2005 | Kavalam | G06F 21/31 |
| | | | 718/104 |
| 2005/0240761 A1 | 10/2005 | Yui | |
| 2005/0246612 A1* | 11/2005 | Leis | G06F 11/0727 |
| | | | 714/763 |
| 2005/0273858 A1* | 12/2005 | Zadok | G06F 21/50 |
| | | | 726/24 |
| 2006/0015747 A1 | 1/2006 | Van de Ven | |
| 2006/0123062 A1 | 6/2006 | Bobbitt et al. | |
| 2006/0272021 A1 | 11/2006 | Marinescu et al. | |
| 2007/0180530 A1 | 8/2007 | Verma et al. | |
| 2007/0204012 A1* | 8/2007 | Kruse | G06F 11/0709 |
| | | | 709/219 |
| 2007/0226320 A1* | 9/2007 | Hager | G06F 17/30194 |
| | | | 709/219 |
| 2008/0209551 A1* | 8/2008 | Treacy | G06F 21/53 |
| | | | 726/22 |
| 2008/0222215 A1 | 9/2008 | Bai et al. | |
| 2008/0270405 A1* | 10/2008 | White | G06F 17/30171 |
| 2009/0282485 A1 | 11/2009 | Bennett | |
| 2010/0031361 A1 | 2/2010 | Shukla | |
| 2010/0154062 A1 | 6/2010 | Baram et al. | |
| 2010/0262584 A1 | 10/2010 | Turbin et al. | |
| 2011/0162077 A1 | 6/2011 | Kadam | |

OTHER PUBLICATIONS

International application No. PCT/CN2012/077381: International Search Report dated Sep. 27, 2012, 2 pages.

Swinehart et al.; "WFS: A Simple Shared File System for a Distributed Environment"; Year: 2009; Xerox Palo Alto Research Center; 9 pages.

* cited by examiner

```
//
// Finally, if an EaBuffer was specified, ensure that it is readable
// from the caller's mode and capture it.
//                                        capture : Re-establish if (ARGUMENT_PRESENT( EaBuffer ) && EaLength) {

ULONG errorOffset;

try {

ProbeForRead( EaBuffer, EaLength, sizeof( ULONG ) );
        openPacket->EaBuffer = ExAllocatePoolWithQuotaTag( NonPagedPool,
                                                           EaLength,
                                                           'aEoI' );

openPacket->EaLength = EaLength;
        RtlCopyMemory( openPacket->EaBuffer, EaBuffer, EaLength );

//
        // Walk the buffer and ensure that its format is valid.  Note
        // that has been probed.
        // status = IoCheckEaBufferValidity( openPacket->EaBuffer,
                                          EaLength,
                                          &errorOffset );

if (!NT_SUCCESS( status )) {
            IoStatusBlock->Status = status;
            IoStatusBlock->Information = errorOffset;
```

FIG. 3

METHOD AND SYSTEM FOR UNLOCKING AND DELETING FILE AND FOLDER

CROSS-REFERENCE TO RELATED APPLICATIONS

This application is a continuation of application Ser. No. 14/128,592, filed on Dec. 20, 2013, which claims the benefit of National Stage of International Application No. PCT/CN2012/077381, filed Jun. 21, 2012, which claims the benefit of Chinese Patent Application No. 201110175389.X, filed Jun. 27, 2011, the disclosures of which are incorporated herein by reference in their entireties.

TECHNICAL FIELD

The embodiments of the present invention relates to a security software field, and in particular, to a method and a system for unlocking and deleting a file and a folder.

BACKGROUND OF THE INVENTION

A computer virus refers to a set of computer instructions or program codes which are inserted into computer programs by a programmer to destroy computer functions or data, and can influence the use of a computer and be able to self-duplicate. Once a computer is infected with a virus, the files in the computer usually exhibit addition, deletion, modification of a name or an attribute and movement to other catalogue. The operations of the virus on the computer files may lead to a series of problems, such as an normal program being not able to be run, collapse of a computer operating system, the computer being controlled remotely and unauthorized use of user information.

To ensure a safe operation of the computer, it is necessary to search and kill viruses that may infect the files in the system thereby preventing and eliminating the destruction of the viruses. In the security software field, "deleting" and "anti-deleting" the computer files infected with a virus is one of eternity subjects of a confrontation between a security software and a malignant program (computer virus). Usually, a virus in the prior art may apply a encryption lock to a file infected with a virus by means of occupying a file handle, setting a file attribute to be read-only and keeping the file in a deleted status and so on. The encryption lock cannot be cracked (that is the file infected with the virus cannot be deleted) by conventional means. These means can prevent an antivirus software from cleaning the file infected with the virus. The procedure of killing the virus by the security software may be regarded as unlocking and crushing a virus file. A current security software having simple means for unlocking and crushing the virus file cannot relieve the obstructions set by the virus file and have a weak confrontation capability.

SUMMARY OF THE INVENTION

The embodiments of the invention provide a method and a system for unlocking and deleting a file and a folder, which can completely delete files infected with a virus.

In order to address the above problems, the embodiment of the invention discloses a method of unlocking a file or a folder, comprising the following steps:
receiving an unlock request of a file or a folder, wherein the unlock request comprises an input parameter;
verifying whether the input parameter complies with a preset condition;
if the input parameter complies with the preset condition, correcting a deformed path format of the file or the folder and/or a special file name of the file or a special folder name of the folder according to a preset rule;
determining whether the corrected file or folder has a restrictive setting; and
if yes, cleaning the restrictive setting of the file or the folder.

Preferably, the restrictive setting of the file comprises any one or more combinations of a read-only lock, a routine lock, a limit of an authority, or an occupation of a handle, and the restrictive setting of the folder comprises any one or more combinations of the read-only lock, the limit of the authority, or the occupation of the handle; and
the step of cleaning the restrictive setting of the file or the folder comprises:
removing the read-only lock if the read-only lock is present;
removing the routine lock if the routine lock is present;
adding a corresponding authority if the limit of the authority is present; and
closing the handle if the handle is occupied.

Preferably, the unlock request further comprises a user mode address, and after the step of receiving an unlock request of the file or the folder, the method further comprises the following steps:
establishing a kernel mode structure parameter corresponding to a platform and a version of an operating system;
generating a corresponding file operation control code according to the kernel mode structure parameter and sending the file operation control code to a kernel mode driver of the operating system; and
obtaining the unlock request of the file or the folder and re-establishing the user mode address to a kernel mode memory space by the kernel mode driver of the operating system.

Preferably, the input parameter comprises a numeric input parameter, an address input parameter and the user mode address/structure, and the step of verifying whether the input parameter complies with the preset condition comprises the following steps:
determining whether the numeric input parameter is within a preset range;
determining whether a conflict of the input parameter exists;
determining whether the address input parameter has a corresponding authority; and
determining whether a same address/structure in a kernel is re-established for the user mode address/structure required to be repeatedly accessed and read.

Preferably, the method further comprises:
closing unlocking of the file or the folder if the input parameter does not comply with the preset condition.

Preferably, the step of removing the routine lock comprises: completing removal of the routine lock by calling a driver switch process environment.

Preferably, the method further comprises:
setting an error code corresponding to error information formed during the unlocking of the file or the folder; and
calling a GetLastError routine to obtain detailed error information formed during the unlocking of the file or the folder according to the error code.

The embodiment of the invention discloses a method for deleting a file or a folder, comprising:
receiving a delete request of a file or a folder, wherein the delete request comprises an input parameter;
verifying whether the input parameter complies with a preset condition;

if the input parameter complies with the preset condition, correcting a deformed path format of the file or the folder and/or a special file name of the file or a special folder name of the folder according to a preset rule;

cleaning a restrictive setting of the file or the folder; and opening the file or the folder by using penetration technology and deleting the file or the folder.

Preferably, the delete request further comprises a user mode address, and after the step of correcting the deformed path format of the file or the folder and/or the special file name of the file or the special folder name of the folder according to the preset rule, the method further comprises:

establishing a kernel mode structure parameter corresponding to a platform and a version of an operating system;

generating a corresponding file operation control code according to a kernel mode structure parameter and sending the file operation control code to a kernel mode driver of the operating system; and obtaining the delete request of the file or the folder and re-estabishing the user mode address to a kernel mode memory space by the kernel mode driver of the operating system.

Preferably, the step of cleaning the restrictive setting of the file or folder comprises:

removing the read-only lock if the read-only lock is present;

removing the routine lock if the routine lock is present;

adding a corresponding authority if the limit of the authority is present; and closing the handle if the handle is occupied.

Preferably, the step of opening the file or the folder by using the penetration technology and deleting the file or the folder comprises:

searching a corresponding file or folder object parse routine in an object manager according to a path of the file or the folder;

if the corresponding file or folder object parse routine is found, generating an I/O request package according to the file or folder object parse routine and sending it to a preset original address of a under layer device of a file or folder system, wherein the I/O request package comprises a file removal information extracted from the delete request; and deleting the corresponding file or folder according to the file removal information by the under layer device of the file or folder system.

Preferably, the method further comprises: switching the process close operation when the file or folder cannot be opened by using the penetration technology.

Preferably, the method further comprises the following steps:

setting an error code corresponding to error information formed during unlocking of the file or the folder; and calling a GetLastError routine to obtain detailed error information formed during the unlocking of the file or the folder according to the error code.

Preferably, the input parameter comprises a numeric input parameter, an address input parameter and a user mode address/structure, and the step of verifying whether the input parameter complies with the preset condition comprises:

determining whether the numeric input parameter is within a preset range;

determining whether a conflict of the input parameter exists;

determining whether the address input parameter has a corresponding authority; and determining whether a same address/structure in a kernel is re-established for the user mode address/structure required to be repeatedly accessed and read.

Preferably, the method of deleting further comprises:

zero clearing a reference count of the file or the folder.

The embodiment of the invention also discloses a system for unlocking a file or a folder, comprising:

an unlock request receiving module, configured to receive an unlock request of a file or a folder, wherein the unlock request comprises an input parameter;

a verifying module, configured to verify whether the input parameter complies with a preset condition;

a correcting module, configured to, if the input parameter complies with the preset condition, correct a deformed path format of the file or the folder and/or a special file name of the file or a special folder name of the folder according to a preset rule;

a file restriction determining module, configured to determine whether a restrictive setting of the corrected file or folder is present and, if yes, call a cleaning module; and a cleaning module, configured to clean the restrictive setting of the file or folder.

The embodiment of the invention also discloses a system for deleting a file or a folder, comprising:

a delete request receiving module, configured to receive a delete request of a file or a folder, wherein the delete request comprises an input parameter;

a verifying module, configured to verify whether the input parameter complies with a preset condition;

a correcting module, configured to correct a deformed path format of the file or the folder and/or a special file name of the file or a special folder name of the folder according to a preset rule if the input parameter complies with the preset condition;

a cleaning module, configured to clean the restrictive setting of the file or the folder; and a deleting module, configured to open the file or the folder by using penetration technology and delete the file or the folder.

The embodiment of the invention also discloses a computer-readable recording medium on which a program configured to execute the method according to claim 1 is recorded.

The embodiment of the invention also discloses a computer-readable recording medium on which a program configured to execute the method according to claim 8 is recorded.

Compared to the prior art, the embodiment of the present invention has advantages as follows:

The method for unlocking the file or the folder according to the embodiments of the present invention may relieve the protections arranged by the files infected with a virus by using a plurality of means such as removing the read-only lock, removing the routine lock, adding the authority and closing the handle, thereby increasing the confrontation capacity of the security software against malignant program.

The method for deleting the file or the folder according to the embodiment of the present invention may remove the read-only lock and open files by applying penetration technology, and zero clear the reference count of the file by sending an IRP (I/O request packets) delete request to the original address of the file system, thereby avoiding the potential incompatible possibility formed between the security software due to the interference of the file operations.

By applying the embodiment of the present invention, the kernel mode driver of the operating system may obtain and verify the request from user mode, establish a file path input by the circular parse of the inquiry data structure, and find the object type maintained in the object manager. This procedure may efficiently confront the seizing risk of the kernel mode. Then, the kernel mode driver of the operating system may establish and fill the IRP request packet and send it to a preset original address of underlay device of a file system. At this time, the file system may call the third-part filter driver on the stack, and other security software and driver-level malignant program can be penetrated. Thereby it is possible to avoid the potential incompatible possibility formed between the security software due to the interference of the file operations, while increasing the confrontation capacity against the driver-level malignant program when attacking and defending.

BRIEF DESCRIPTION OF THE DRAWINGS

FIG. 3 is a code of a corresponding IopCreateFile function when determining whether the user mode address/structure required to be repeatedly accessed and read needs to recreates a same address/structure in a kernel, in the first method embodiment of the embodiments of the present invention;

DETAILED DESCRIPTION OF THE EMBODIMENTS

The specific examples of the embodiments of the present invention will be further described in detail with reference to the accompanying drawings and embodiments. The following examples are configured to illustrate the embodiments of the present invention and are not used to limit the scope of the embodiments of the present invention.

The core idea of the embodiments of the present invention is: increasing the confrontation capacity of a security software against a malignant program by using a plurality of means to relieve the obstructions of files infected with a virus layer by layer; removing a read-only lock and opening a file by applying a penetration technology, zero clearing the reference count of the file by sending an IRP delete request to the original address of a file system, and thereby avoiding the potential incompatible possibility formed between the security software due to the interference of file operations.

Figures 1, 2:
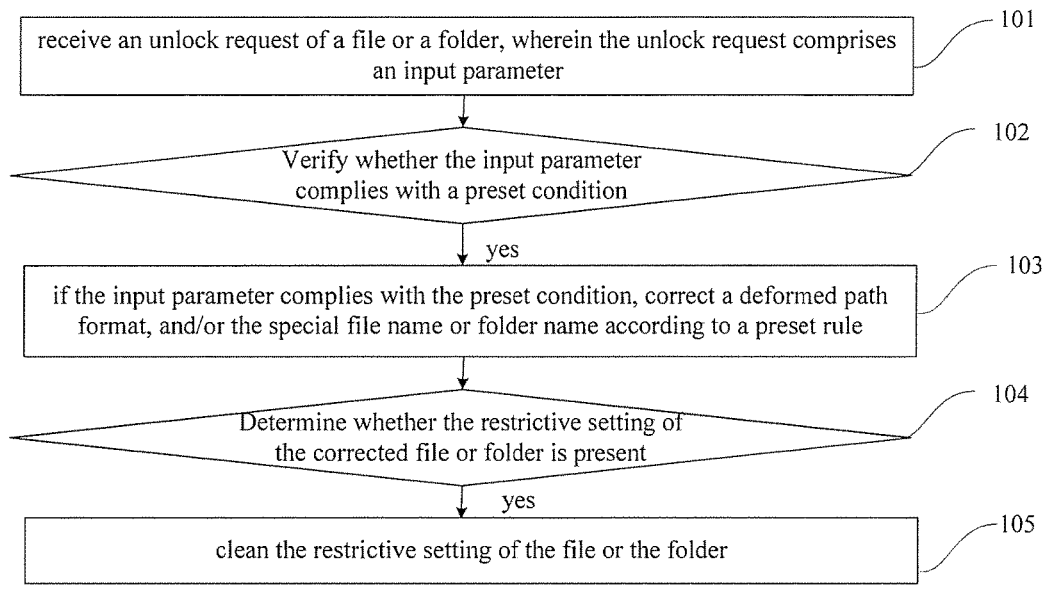
FIG. 1 is a flow chart of a method for unlocking a file or a folder shown in a first method embodiment of the embodiments of the present invention.
FIG. 2 is a code of a corresponding IopCreateFile function when determining an address type input parameter in the first method embodiment of the embodiments of the present invention.

Referring to FIG. 1, a flowchart of steps in a first embodiment of unlocking a file or a folder is shown, and the method may particularly comprise:

Step 101: receive an unlock request of a file or a folder, wherein the unlock request comprises an input parameter;
Step 102: verify whether the input parameter complies with a preset condition;
Step 103: if the input parameter complies with the preset condition, correct a deformed path format, and/or the special file name or folder name of the file or folder according to a preset rule;
Step 104: determine the restrictive setting of the corrected file or folder is present; and
Step 105: if yes, clean the restrictive setting of the file or the folder.

In the procedure of step 104, the step of clean the restrictive setting of the file or the folder may include: if a read-only lock is present, clearing the read-only lock; if a routine lock is present, clearing the routine lock; if a limit of an authority is present, adding a corresponding authority; if the occupation of a handle is present, closing the handle. The restrictive setting of the file may include any one or more combinations of the read-only lock, the routine lock, the limit of authority, or the occupation of handle. The restrictive setting of folder may include any one or more combinations of the read-only lock, the limit of the authority, or the occupation of the handle. Generally, the routine lock is only directed to a file. Of course, if an action of clearing the routine lock is added to the clearance of the restrictive setting of the folder, information without the routine lock of the folder is returned. Therefore, the clearance restrictive setting of the file/folder may be set the same settings.

As well known, a routine is a collection of function interfaces or services externally provided by a system, such as a service or an API of an operating system. As an example of a specific application according to the embodiment of the present invention, the routine lock may be a Windows API LockFile routine lock, and the removal of the routine lock may be realized by calling a driver switch process environment.

In the procedure of step 101, the step of verifying whether the input parameter complies with the preset condition may be implemented with reference to the following example:

The kernel mode function IopCreateFile is a final realization of a user mode function CreateFile. The logic of opening by penetrating technology may completely simulate the IopCreateFile, including details of each parameter. The function prototype of the IopCreateFile is as follows:

```
NTSTATUS
IopCreateFile {
    OUT PHANDLE FileHandle,
    IN ACCESS_MASK DesiredAccess,
    IN POBJECT_ATTRIBUTES ObjectAttributes,
    OUT PIO_STATUS_BLCOK IoStatusBlock,
    IN PLARGE_INTEGER AllocationSize OPTIONAL,
    IN ULONG FileAttributes,
    IN ULONG ShareAccess,
    IN ULONG Disposition,
    IN ULONG CreateOptions,
    IN PVOID EaBuffer OPTIONAL,
    IN ULONG EaLength,
    IN CREATE_FILE_TYPE CreateFileType,
    IN PVOID ExtraCreateParameters OPTIONAL,
    IN ULONG Options,
    IN ULONG InternalFlags,
    IN PVOID DeviceObject
}
```

IN indicates that the parameter is an input, that is input to the IopCreateFile function; OUT indicates that the parameter is an output, that is output from the IopCreateFile function. The correctness of all the IN parameters should be verified, and the writability of all the OUT parameters (addresses for receiving the OUT) should be verified. 467 lines of codes are used totally by the IopCreateFile to verify these parameters. The principle of verify may include:

(1) determining whether a numeric input parameter is within a preset range, as shown in the following codes:

```
//
//Check that no invalid file attributes flags were specified.
//
//   (FileAttributes &~FILE_ATTRIBUTE_VALID_SET_FLAGS)
(FileAttributes &~FILE_ATTRIBUTE_VALID _FLAGS)
//
// Check that no invalid share access flags were specified.
//
(ShareAccess &~FILE_SHARE_VALID_FLAGS)
//
//Ensure that the disposition value is in range.
//
(Disposition > FILE_MAXIMUM_DISPOSITION)
```

(2) determining whether the conflict of the input parameter exists; for example, file attributes "Writeable" and "ReadOnly" are incompatible, so they could not be specified at the same time, as referred to in the following codes:

```
//
// FILE_COMPLETE_IF_OPLOCK and FILE_RESERVE_OPFILTER are
// incompatible option.
//
((CreateOptions & FILE_COMPLETE_IF_OPLOCKED) &&
(CreateOptions & FILE_RESERVE_OPFILTER))
```

(3) determining whether an address input parameter is required to have a corresponding authority; all the user mode pointers (the "address" input parameter) are needed to have corresponding authorities (for example, if it is required to read a certain user mode address, this user mode address should be "readable"; and if it is required to write in a certain user mode address, this user mode address should be "writeable"), as it can be seen in FIG. 2.

(4) determining whether a same address/structure in a kernel is re-established for the user mode address/structure required to be repeatedly accessed and read. The corresponding codes of the IopCreateFile function can refer to FIG. 3.

In the procedure of step 101, if the input parameter does not comply with the preset condition, the process of unlocking the file or the folder may be ended directly.

In the procedure of step 103, if no restrictive setting of the corrected file or folder is present, the unlocking is ended.

In the first embodiment as discussed above, steps 101, 102 and 103 can be performed under a state of the user mode in the operating system, and steps 104 and 105 can be performed under a state of the kernel mode in the operating system. Generally, the unlock request may also include a user mode address. In practice, after the step 101, the embodiment of the present invention may also include the following steps:

establishing a kernel mode structure parameter corresponding to the platform and the version of the operating system;

generating a corresponding file operation control code according to the kernel mode structure parameter and sending the file operation control code to a kernel mode driver of the operating system; and obtaining the unlock request of the file or the folder and re-establishing the user mode address to a kernel mode memory space by the kernel mode driver of the operating system.

In the first embodiment as discussed above, in order to understand the situation of unlocking the file, the method may also include the following steps: setting an error code corresponding to error information formed during the unlocking of the file; and calling a GetLastError routine to obtain detailed error information formed during the unlocking of the file according to the error code.

Herein, the called GetLastError routine may be a GetLastError routine called by a caller in the user mode. In order that the obtained error information is synchronized, it may be set that the kernel synchronous call returns the result of a user mode call. If the call fails, a corresponding error code may be set by a user mode interface. As such, a caller thread may obtain the detailed error information by the GetLastError routine.

In order to make the kernel interface correspond to a user mode export interface, control codes, such as FILE_IO_FORCE_KILL_FILE, FILE_IO_FORCE_KILL_DIRECTORY, FILE_IO_GET_LOCK and FILE_IO_SET_LOCK define a uniform identifier at the time of the communication between the user mode and the kernel mode drivers. METHOD_BUFFERED transmission may be used in input/output buffers of the communication. A communication structure is compatible with 32-bit, 64-bit and 32-bit compatibility mode.

Figure 4:
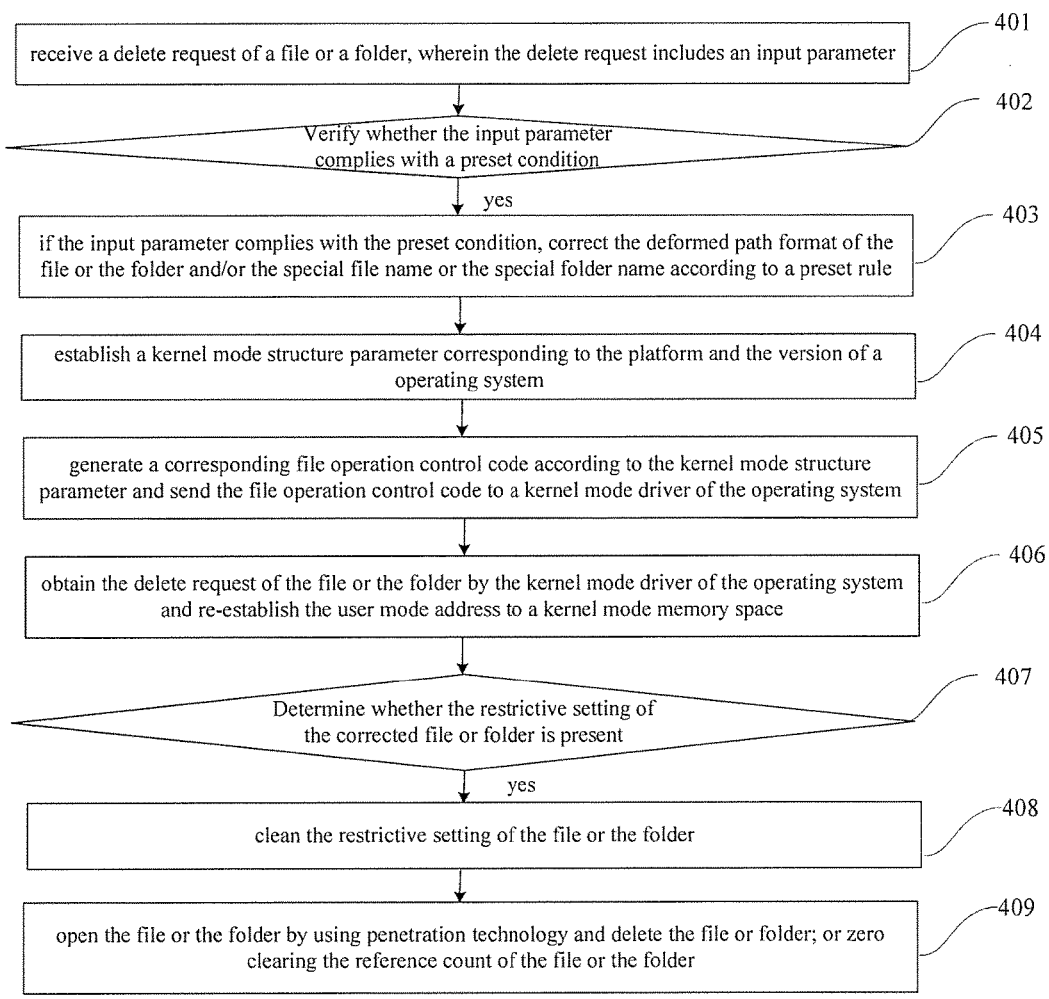
FIG. 4 is a flow chart of a method for deleting a file or a folder in a second method embodiment of the embodiments of the present invention.

Referring to FIG. 4, it shows a flowchart of steps of a second embodiment of a method for deleting a file or a folder, and the method may particularly comprise the following steps:

Step 401: receive a delete request of a file or a folder, wherein the delete request includes an input parameter;

Step 402: verify whether the input parameter complies with a preset condition;

Step 403: if the input parameter complies with the preset condition, correct the deformed path format of the file or the folder and/or the special file name of the file or the special folder name of the folder according to a preset rule;

Step 404: establish a kernel mode structure parameter corresponding to the platform and the version of an operating system;

Step 405: generate a corresponding file operation control code according to the kernel mode structure parameter and send the file operation control code to a kernel mode driver of the operating system;

Step 406: obtain the delete request of the file or the folder by the kernel mode driver of the operating system and re-establish the user mode address to a kernel mode memory space;

Step 407: determine whether the restrictive setting of the corrected file or folder is present; if yes, continue to perform step 408;

Step 408: clean the restrictive setting of the file or the folder; and

Step 409: open the file or the folder by using penetration technology and delete the file or folder; or zero clearing the reference count of the file or the folder.

In a specific embodiment, an FSForceKill file removal procedure initiated by the caller process may be received; the user request may be received and the input parameter may be verified inside the FSForceKill routine. After the processing of the deformed path format and the special file name, the routine determines the current platform (32-bit, 64-bit or 32-bit compatibility mode) and version of the operating system, establishes the kernel mode structure parameter, send the control code FILE_IO_FORCE_KILL_FILE to the operating system kernel, and synchronize and wait to return. The kernel mode driver of the FSForceKill routine receives the user mode request, and re-establishes the user mode address to the kernel memory space after verifying the input parameter again. The penetration technology may be used to remove the read-only lock of the file requested to be deleted with the read-only lock and open the file requested to be deleted; in the prior art, the methods for accomplishing penetration can be selected according to requirement, and the description thereof will be omitted. The IRP delete request data package established and filled may be sent to the original address of the file system; this step may cause a third-part filter driver (other security software and driver-level malignant program) on the call stack of the file system to be bypassed, thereby increasing the compatibility between the security software to which the embodiment of the present invention is applied and other security software.

When facing a target file which cannot be opened by the penetration method, such as the STATUS_DELETE_PENDING, operations, such as enumerating a global handle and closing a switching process may be driven to attempt.

In the embodiment for deleting a file, in order to understand the situation of deleting the file, the method may also include the following steps: setting an error code corresponding to error information formed during the procedure of deleting the file; and calling the GetLastError routine to obtain detailed error information formed during the procedure of deleting the file according to the error code.

Herein, the called GetLastError routine may be a GetLastError routine called by a caller in the user mode. In order to make the obtained error information to be synchronized, it may be set that a kernel synchronously call and returns the result of a user mode call. If the call fails, a corresponding error code may be set by a user mode interface. As such, a caller thread may obtain the detailed error information by the GetLastError routine.

The relation between the step 408, at which the penetration technology is used to open the file and the folder and delete the file and the folder, and the step 409, at which the reference count of the file or the folder is zero cleared, is serial, which means they are independent two steps. When the penetration technology is used to open the file and the folder and delete the file and the folder at step 408, the step 408, at which the reference count of the file or the folder is zero cleared, may also efficiently delete the file or the folder. If the file or the folder could be deleted at step 408, the step, at which the reference count of the file or the folder is zero cleared, may be skipped.

In a preferred embodiment of the embodiments of the present invention, the step 408 may include the following sub-steps:

searching a corresponding file or folder object parse routine in an object manager according to a path of the file or the folder;

if the corresponding file or folder object parse routine is found, generating an I/O request package according to the corresponding file or folder object parse routine and sending it to a preset original address of a under layer device of a file or folder system, wherein the I/O request package includes a file removal information extracted from the delete request; and deleting the corresponding file or folder according to the file removal information by the under layer device of the file or folder system.

In the second embodiment as discussed above, correcting the deformed path format and/or special file name according to the preset rule can be accomplished by calling an FSDeleteFileA/FSDeleteFileW routine, and an FSDeleteFileA/FSDeleteFileW export routine strictly follow the definition and the parameter of the Windows standard API. The FSDeleteFileA may transform the input parameter to UNICODE type. The FSDeleteFileW may process the deformed file name and file path, and practically accomplish parameter transformation, control code communication and so on. After calling the FSDeleteFileW routine, the kernel mode driver of the routine may verify the user mode input parameter again, then establish and fill the IRP request package and send the IRP request package to the device object of the file system (that is, send it to the original address of the file system), thereby completing the file penetration removal procedure. The kernel mode driver of the FSForceKill may also accomplish the zero clearing of the reference count of the file or the folder.

In the procedure of step 401, the detailed implementation of verifying whether the input parameter complies with a preset condition can refer to the specific operations of the first embodiment as discussed above, and thus the explanation thereof will be omitted.

Detailed description will be made to the interfaces and main functions used herein to which the method of the embodiments of invention is applied. Additionally, for the purpose of easy understanding, a specific flow chart is given in the drawings.

The description of the interfaces and main functions is as follows: 7 routines are exported from the unlocking of the file or the folder and the removal of the user mode portion, the set of interfaces covers most of demands for unlocking and crushing files (the exported routines include FSDeleteFile, FSForceKill, FSRemoveDirectory, GetFileLock, SetFileLock and so on, the call modes of these routines are different for the input of UNICODE and ANSI), and the "call convention" and "call parameter" of the interfaces comply with the Windows standard API with the same names.

Corresponding to the export interface, the control codes, such as FILE_IO_FORCE_KILL_FILE, FILE_IO_FORCE_KILL_DIRECTORY, FILE_IO_GET_LOCK and FILE_IO_SET_LOCK define a uniform identifier at the time of the communication between the user mode and the kernel mode drivers. METHOD_BUFFERED mode transmission is used for input/output buffers of the communication. A communication structure is compatible with 32-bit, 64-bit and 32-bit compatibility mode.

Taking the file penetration removal procedure as an example, the FSDeleteFileA/FSDeleteFileW export routines strictly follow the definition and the parameter of the Windows standard API. The FSDeleteFileA may transform the input parameter to a UNICODE type. The FSDeleteFileW may process the deformed file name and a path of the file, and practically accomplish parameter transformation, control code communication and so on.

The kernel mode driver of the FSDeleteFileW may verify the user mode input parameter, then establish and fill the IRP request package and send the IRP request package to the device object of the file system, thereby completing the file penetration removal procedure. The kernel mode driver of the FSForceKill may zero clear the reference count of the file, and globally enumerate and close handles, and so on.

Figure 5:
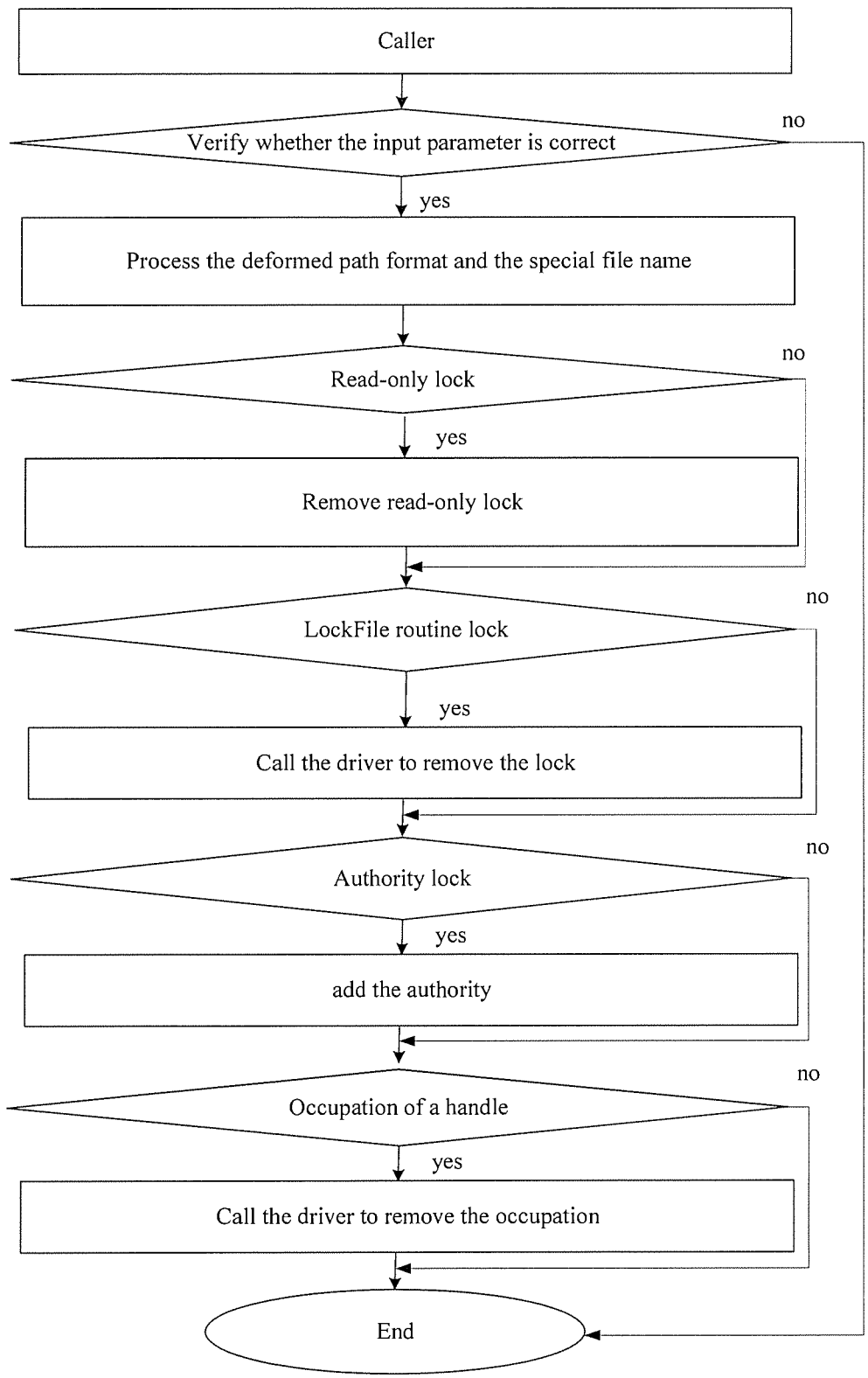
FIG. 5 is a flow chart of a method for unlocking a file in a third method embodiment of the embodiments of the present invention.

The third embodiment provides a specific procedure of unlocking a file. Referring to FIG. 5, the procedure may include the following steps: initiating a GetFileLock/Set- FileLock file unlock procedure by a caller process; receiving a user request and verifying an input parameter inside the GetFileLock/SetFileLock routine; following the processing of a deformed path format and a special file name, determining whether a target file has a read-only attribute, and if a read-only lock is present, removing the read-only lock of the file requested to be unlocked with the read-only lock; determining whether the target file is locked by a Windows API LockFile routine; if the target file is locked by the LockFile routine, calling a driver switch process environment to unlock the file; determining whether the target file has an authority and an owner restriction; if the target file has a limit of authority, adding a corresponding authority; determining whether the target file has the occupation of a handle; if the target file has the occupation of the handle, calling and driving a global handle enumerating procedure to close the handle and unlock the file; returning the result of a user mode call by the kernel synchronous call, and if the call fails, setting a corresponding error code by a user mode interface, as a result of which a caller thread obtains the detailed error information by the GetLastError routine.

Figure 6:
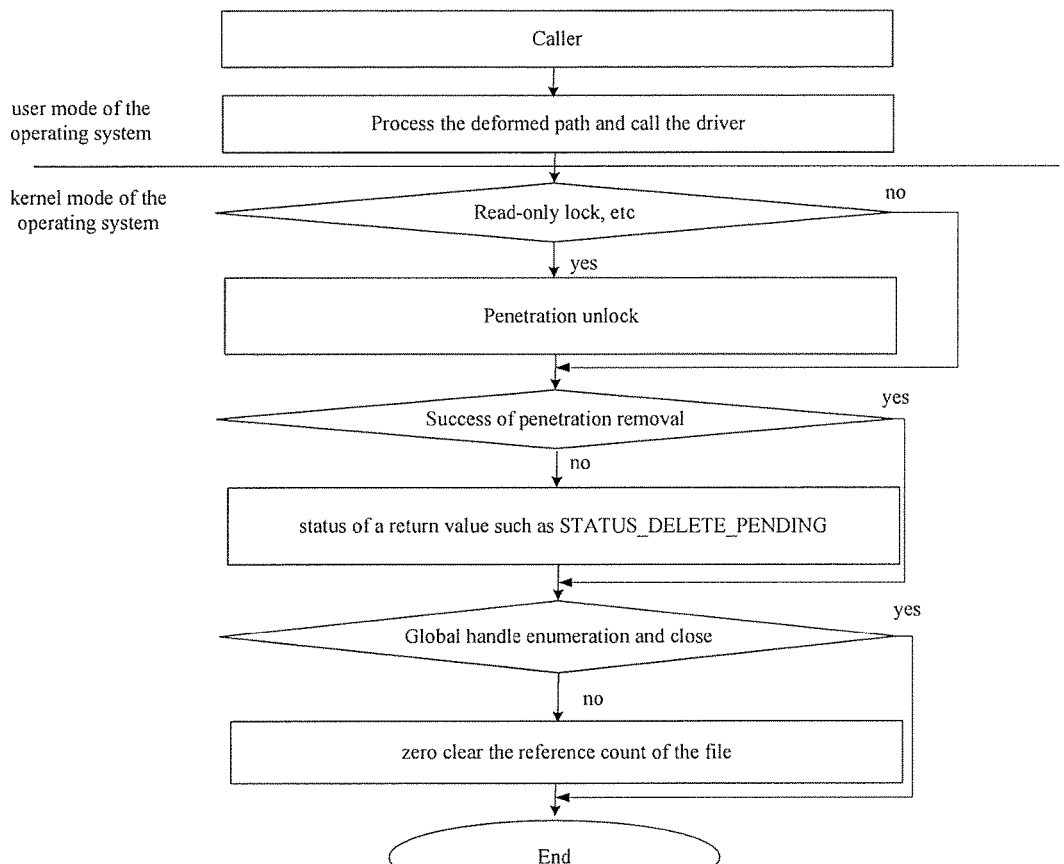
FIG. 6 is a flow chart of a method for deleting a file according to a fourth method embodiment of the embodiments of the present invention.

The fourth embodiment provides a specific procedure of deleting a file. Referring to FIG. 6, the procedure may include the following steps: initiating a FSForceKill file crush procedure by a caller process; receiving a user request and verifying an input parameter inside a FSForceKill routine. Following the processing of a deformed path format and a special file name, the routine determines the platform (32-bit, 64-bit or 32-bit compatibility mode) and version of a current operating system, establishes a kernel mode structure parameter, sends a control code FILE_IO_FORCE_KILL_FILE, and synchronizes and waits for returning; the kernel mode driver of the FSForceKill routine receives a user mode request, verifies the input parameter again, and captures the user mode address to a kernel memory space; a penetration technology is used to determine and remove the read-only attribute of a target file; the penetration technology is used to open the target file, establishes and fills an IRP delete request data package, and sends it to the original address of a file system, and at this time, the third-part filter driver (other security software and driver-level malignant program) on the call stack of the file system may be bypassed; for a target file which cannot be opened by the penetration method, such as STATUS_DELETE_PENDING, operations for deleting a file, such as enumerating a global handle and closing switching process may be driven to attempt; the operation of zero clearing the reference count of the file may be driven if necessary; the kernel synchronous call returns the result of user mode call. If the call fails, the corresponding error code may be set by a user mode interface. As such, a caller thread may obtain the detailed error information by the GetLastError routine.

Figure 7:
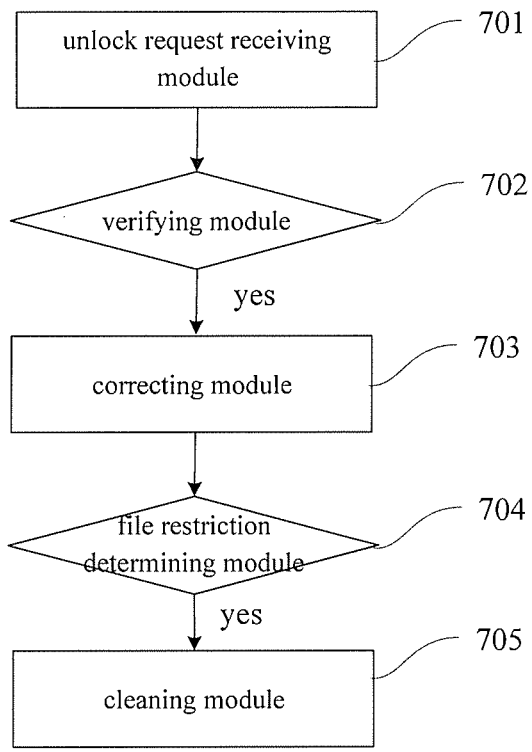
FIG. 7 is a schematic block diagram of a system for unlocking a file or a folder in a fifth system embodiment of the embodiments of the present invention.

Referring to FIG. 7, a block diagram of a system for unlocking a file or a folder according to a fifth embodiment of the present invention is shown. The system may include the following modules:

an unlock request receiving module 701, configured to receive an unlock request of a file or a folder, wherein the unlock request comprises an input parameter;

a verifying module 702, configured to verify whether the input parameter complies with a preset condition;

a correcting module 703, configured to, if the input parameter complies with the preset condition, correct a deformed path format of the file or the folder and/or a special file name of the file or a special folder name of the folder according to a preset rule; a file restriction determining module 704, configured to determine whether a restrictive setting of the corrected file or folder is present and, if yes, call a cleaning module 705; and a cleaning module 705, configured to clean the restrictive setting of the file or folder.

After the unlock request receiving module 701 receives an unlock request from a user, the verifying module 702 verifies whether the input parameter complies with the preset condition. If the input parameter does not comply with a preset condition, end the unlocking of the file or the folder; and if the input parameter complies with the preset condition, the verifying module 702 sends an instruction to the correcting module 702. After the correcting module 702 receives the instruction, the correcting module 702 corrects the deformed path format and/or the special file or folder name according to the preset rule; for file or folder information processed by the correcting module 702, it is determined by a file restriction determining module 703 whether the restrictive setting of the corrected file or folder that is to be unlocked is present; if yes, the cleaning module 704 cleans the restrictive setting of the file or folder, thereby accomplishing the unlocking of the file or the folder.

In the specific implementation, the restrictive setting of the file may include any one or more combinations of a read-only lock, a routine lock, a limit of an authority, or an occupation of a handle; the restrictive setting of the folder may include any one or more combinations of the read-only lock, the limit of the authority, or the occupation of handle; in this case, the clearing module includes:

a read-only lock removal sub-module, configured to remove the read-only lock when the read-only lock is present;

a routine lock removal sub-module, configured to remove the routine lock when the routine lock is present;

an authority adding sub-module, configured to add a corresponding authority when the limit of the authority is present; and a handle closing sub-module, configured to close the handle when the handle is occupied.

In the specific application, the routine lock removal sub-module may remove the routine lock by calling a driver switch process environment.

As an example of a specific application according to the embodiments of the present invention, the unlock request may also include a user mode address, and the embodiment of the system for unlocking the file or folder may also include the following modules:

a kernel mode structure parameter establishing module, connected to the unlock request receiving module 701, configured to establish a kernel mode structure parameter corresponding to a platform and a version of the operating system;

a control code generating and sending module, configured to generate a corresponding file operation control code according to the kernel mode structure parameter and send the file operation control code to a kernel mode driver of the operating system; and an address re-establishing module, configured to obtain the unlock request of the file or the folder and re-establish the user mode address to a kernel mode memory space by the kernel mode driver of the operating system.

In a preferred embodiment of the present invention, the input parameter may include a numeric input parameter, an address input parameter and the user mode address/structure, and the verifying module 702 may include the following sub-modules:

a first determining sub-module, configured to determine whether the numeric input parameter is within a preset range;

a second determining sub-module, configured to determine whether the conflict of the input parameter is present;

a third determining sub-module, configured to determine whether the address input parameter has a corresponding authority; and a fourth determining sub-module, configured to determine whether a same address/structure is re-established in the kernel for the user mode address/structure required to be repeatedly accessed and read.

In the specific implementation, the embodiment of the system for unlocking the file or the folder may also include the following module:

an unlock ending module, configured to end the unlocking of the file or the folder if the input parameter does not comply with the preset condition.

In a preferred embodiment of the present invention, the embodiment of the system for unlocking the file or the folder may also include the following modules:

an error code setting module, configured to set an error code corresponding to error information formed during the unlocking of the file or the folder; and an error information obtaining module, configured to call a GetLastError routine to obtain detailed error information formed during the unlocking of the file or the folder according to the error code.

Figure 8:
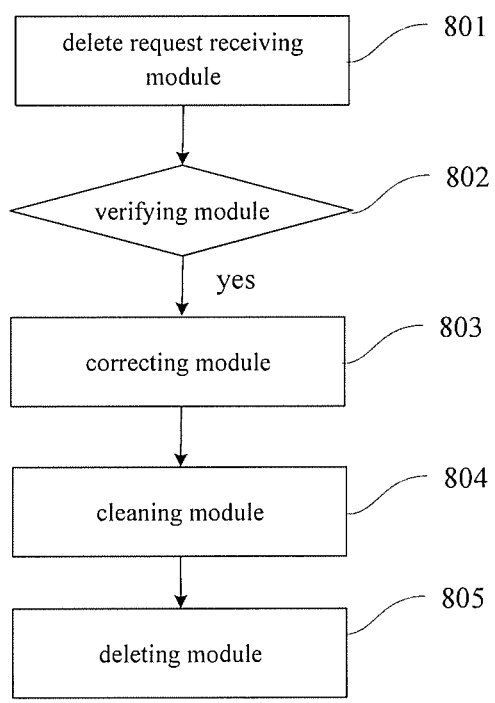
FIG. 8 is a schematic block diagram of a system for deleting a file or a folder in a sixth system embodiment of the embodiments of the present invention.

Referring to FIG. 8, a block diagram of a system for deleting a file or a folder according to a six embodiment of the present invention is shown. In particular, the system may include the following modules:

a delete request receiving module 801, configured to receive a delete request of a file or a folder, wherein the delete request comprises an input parameter;

a verifying module 802, configured to verify whether the input parameter complies with a preset condition;

a correcting module 803, configured to correct a deformed path format of the file or the folder and/or a special file name of the file or a special folder name of the folder according to a preset rule if the input parameter complies with the preset condition;

a cleaning module 804, configured to clean the restrictive setting of the file or the folder; and a deleting module 805, configured to open the file or the folder by using penetration technology and delete the file or the folder.

In the specific implementation, the delete request may also include a user mode address, and the embodiment of the system for deleting the file or the folder may also include the following modules:

a kernel mode structure parameter establishing module, connected to the delete request receiving module 801, configured to establish a kernel mode structure parameter corresponding to the platform and version of the operating system;

a control code generating and sending module, configured to generate a corresponding file operation control code according to the kernel mode structure parameter and send the file operation control code to a kernel mode driver of the operating system; and an address re-establishing module, configured to obtain the unlock request of the file or the folder by the kernel mode driver of the operating system and re-establish the user mode address to a kernel mode memory space.

In the specific implementation, the restrictive setting of the file may include any one or more combinations of a read-only lock, a routine lock, the limit of an authority, or the occupation of a handle; the restrictive setting of the folder may include any one or more combinations of the read-only lock, the limit of the authority, or the occupation of the handle; in this case, the cleaning module may include:

a read-only lock removal sub-module, configured to remove the read-only lock when the read-only lock is present;

a routine lock removal sub-module, configured to remove the routine lock when the routine lock is present;

an authority adding sub-module, configured to add a corresponding authority when a limit of authority is present; and a handle closing sub-module, configured to close the handle when the handle is occupied.

In a preferred embodiment of the present invention, the deleting module 805 may include the following sub-modules:

an object parse routine searching sub-module, configured to search the corresponding file or folder object parse routine in an object manager according to the path of the file or the folder; a request package generating and sending sub-module, configured to, when the corresponding file or folder object parse routine is found, generate an I/O request package according to the corresponding file or folder object parse routine and send it to an preset original address of a under layer device of the file or folder system, wherein the I/O request package includes file removal information extracted from the delete request; and a removal processing sub-module, configured to delete the corresponding file or folder according to the file removal information by the under layer device of the file or folder system.

In a preferred embodiment of the present invention, the embodiment of the file or folder removal system may also include the following module:

a process end operation module, configured to switch the process close operation when the file or folder cannot be opened by the penetration technology.

In the specific implementation, the embodiment of the system for deleting the file or the folder may also include the following module:

an error code setting module, configured to set an error code corresponding to the error information formed during the unlocking of the file or the folder; and an error information obtaining module, configured to call the GetLastError routine to obtain the detailed error information formed during the unlocking of the file or the folder according to the error code.

In the specific implementation, the input parameter may include a numeric input parameter, an address input parameter and the user mode address/structure, and in this case, the verifying module may include the following sub-modules:

a first determining sub-module, configured to determine whether the numeric input parameter is within a preset range;

a second determining sub-module, configured to determine whether the conflict of the input parameter is present;

a third determining sub-module, configured to determine whether the address input parameter has a corresponding authority; and a fourth determining sub-module, configured to determine whether a same address/structure is re-established in the kernel for the user mode address/structure required to be repeatedly accessed and read.

In a preferred embodiment of the present invention, the embodiment of system for deleting the file or the folder may also include the following module:

a reference count zero clearing module, configured to zero clear the reference count of the file or the folder.

In the specific application, after the delete request receiving module receives a delete request of the file or the folder from a user, the verifying module verifies whether the input parameter complies with a preset condition. If the input parameter does not comply with a preset condition, end the deleting of file or folder; and if the input parameter complies with the preset condition, the verifying module sends an instruction to the removal processing module. Following the receipt of the instruction, the removal processing module corrects the deformed path format and/or the special file or folder name according to the preset rule; then the kernel mode structure parameter establishing module determines the platform (32-bit, 64-bit or 32-bit compatibility mode) and version of the current operating system, and establishes the kernel mode structure parameter corresponding to the platform and the version of the system; the control code generating and sending module generates a corresponding file operation control code according to the kernel mode structure parameter and sends the file operation control code to a kernel mode driver of the operating system; the address re-establishing module re-establishes the file delete request end address to the kernel memory space; then the cleaning module cleans the restrictive setting of the file or the folder; the deleting module opens the file or folder requested to be deleted by using the penetration technology and delete the file or folder; the reference count zero clearing module zero clears the reference count of the file or the folder. The relation between the deleting module and the zero clearing module is serial, which means they are independent two modules. When the deleting module fails to delete the file of folder, the zero clearing module 808 may efficiently delete the file or the folder by zero clearing the reference count of the file or the folder. If the deleting module is able to delete the file or folder, the zero clearing module may not be called.

The embodiments of the invention also discloses a computer-readable recording medium on which a program for executing the method embodiment for unlocking a file or a folder is recorded, and a computer-readable recording medium on which a program for executing the method embodiment for deleting a file or the folder is recorded. The computer readable recording medium may include any mechanism which can be used to store and transmit information in a computing device (for example, a computer)-readable form. For example, the machine-readable medium may include read only memory (ROM), a random access memory (RAM), magnetic disk storage media, optical storage media, flash memory media, and/or the signal propagation in electrical, optical, acoustical or other forms (e.g., carrier waves, infrared signals, digital signals, etc.).

The each of embodiments in the description has only emphasized the differences from others, and the same or similar explanations of each embodiment could be made reference to each other. For the embodiment of system, since the embodiment of system is substantially similar to that of corresponding method, the explanations thereof are relatively brief and reference could be made to the embodiment of corresponding method.

The above descriptions are only the preferred examples according to the embodiments of the invention. It should be understood to an ordinary person skilled in the art that improvements and modifications could be made without departing from spirit and principle of the present invention, and therefore these improvements and modifications should be constructed within protection scope of the present invention.

The invention claimed is:

1. A computing device, comprising:
a processor; and
a memory communicatively coupled to the processor and storing instructions that upon execution on the computing device cause the computing device to at least:
receive a request for unlocking a stored data item, wherein the request comprises at least an input parameter, wherein the stored data item is a file or folder;
correct at least one of a deformed path format and special name of the stored data item in response to verifying that the at least an input parameter complies with at least a preset condition;
clean at least a restrictive setting of the stored data item in response to determining that the stored data item has at least a restrictive setting, wherein the at least a restrictive setting of the stored data item comprises a read-only lock, a routine lock, a limit of an authority, or an occupation of a handle; and
delete the stored data item.

2. The computing device of claim 1 wherein the at least an input parameter comprises a number, an address, or a user mode address.

3. The computing device of claim 2 wherein the verifying that the at least an input parameter complies with at least a preset condition comprises determining whether at least one of:
the numeric input parameter is within a preset range;
a conflict of the input parameter exists;
the address input parameter has a corresponding authority; and
a same address as the user mode address is re-established in a kernel.

4. The computing device of claim 2, further comprising instructions upon execution on the computing device causes the computing device to at least:
establish a kernel mode structure parameter corresponding to a platform and a version of an operating system;
generate a corresponding file operation control code according to a kernel mode structure parameter and send the file operation control code to a kernel mode driver of the operating system; and
obtain a request to delete the stored data item by the kernel mode driver of the operating system and re-establish the user mode address to a kernel mode memory space.

5. The computing device of claim 1 wherein the instructions upon execution on the computing device causing the computing device to clean at least a restrictive setting of the stored data item further comprises instructions that upon execution on the computing device cause the computing device to at least:
remove the read-only lock when the read-only lock is present;
remove the routine lock when the routine lock is present;
add a corresponding authority when the limit of the authority is present; and
close the handle when the handle is occupied.

6. The computing device of claim 1 wherein the instructions upon execution on the computing device causing the computing device to delete the file or the folder further comprises instructions that upon execution on the computing device cause the computing device to at least:
search a corresponding file or folder object parse routine in an object manager according to a path of the file or the folder;
in response to finding the corresponding file or folder object parse routine, generate an I/O request package according to the file or folder object parse routine and send it to a preset original address of an underlying device of a file or folder system, wherein the I/O request package comprises a file removal information; and delete, by the underlying device of the file or folder system, the corresponding file or folder according to the file removal information.

7. The computing device of claim 1, further comprising instructions that upon execution on the computing device cause the computing device to at least:

zero clear a reference count of the stored data item.

8. A computing device, comprising:

a processor; and a memory communicatively coupled to the processor and storing instructions that upon execution on the computing device cause the computing device to at least:

receive a request for unlocking a file or folder, wherein the request comprises at least an input parameter;

correct at least one of a deformed path format of the file or folder, a special file name of the file, and a special folder name of the folder in response to verifying that the at least an input parameter complies with at least a preset condition; and clean at least a restrictive setting in response to a determination that the file or folder has the at least a restrictive setting, wherein the at least a restrictive setting of the stored data item comprises a read-only lock, a routine lock, a limit of an authority, or an occupation of a handle.

9. The computing device of claim 8 wherein the instructions upon execution on the computing device causing the computing device to clean at least a restrictive setting of the file or the folder further comprises instructions that upon execution on the computing device cause the computing device to at least:

remove the read-only lock when the read-only lock is present, remove the routine lock when the routine lock is present, add a corresponding authority when the limit of the authority is present, and close the handle when the handle is occupied.

10. The computing device of claim 8 wherein the at least an input parameter comprises a numeric input parameter, an address input parameter, or a user mode address.

11. The computing device of claim 10, further comprising instructions upon execution on the computing device causes the computing device to at least:

establish a kernel mode structure parameter corresponding to a platform and a version of an operating system;

generate a corresponding file operation control code according to a kernel mode structure parameter and send the file operation control code to a kernel mode driver of the operating system; and obtain, by the kernel mode driver of the operating system, a request to unlock the file or the folder and re-establish the user mode address to a kernel mode memory space.

12. The computing device of claim 10 wherein the verifying that the at least an input parameter complies with at least a preset condition further comprises determining whether at least one of:

the numeric input parameter is within a preset range;

a conflict of the input parameter exists;

the address input parameter has a corresponding authority; and a same address as the user mode address is re-established in a kernel.

13. The computing device of claim 8, further comprising instructions that upon execution on the computing device cause the computing device to at least:

end a process of unlocking the file or the folder when the at least an input parameter does not comply with the at least a preset condition.

14. The computing device of claim 8, further comprising instructions that upon execution on the computing device cause the computing device to at least:

set an error code corresponding to error information formed during a process of unlocking the file or the folder; and call a GetLastError routine to obtain detailed error information formed during the process of unlocking the file or the folder according to the error code.

15. A non-transitory computer-readable storage medium, bearing computer-executable instructions that upon execution on a computing device cause the computing device to at least:

receive a request for unlocking a file or folder, wherein the request comprises at least an input parameter;

correct at least one of a deformed path format of the file or folder, a special file name of the file, and a special folder name of the folder in response to verifying that the at least an input parameter complies with at least a preset condition; and clean at least a restrictive setting in response to a determination that the file or folder has the at least a restrictive setting, wherein the at least a restrictive setting of the file or folder comprises a read-only lock, a routine lock, a limit of an authority, or an occupation of a handle.

16. The non-transitory computer-readable storage medium of claim 15 wherein the computer-executable instructions that upon execution on the computing device cause the computing device to at least clean the at least a restrictive setting of the file or folder further comprise instructions that upon execution on the computing device cause the computing device to at least:

remove the read-only lock when the read-only lock is present;

remove the routine lock when the routine lock is present;

add a corresponding authority when the limit of the authority is present; and close the handle when the handle is occupied.

* * * * *